INVENTOR
RUSSELL W. HOUVENER
BY
*D.C. Harrison*
ATTORNEY

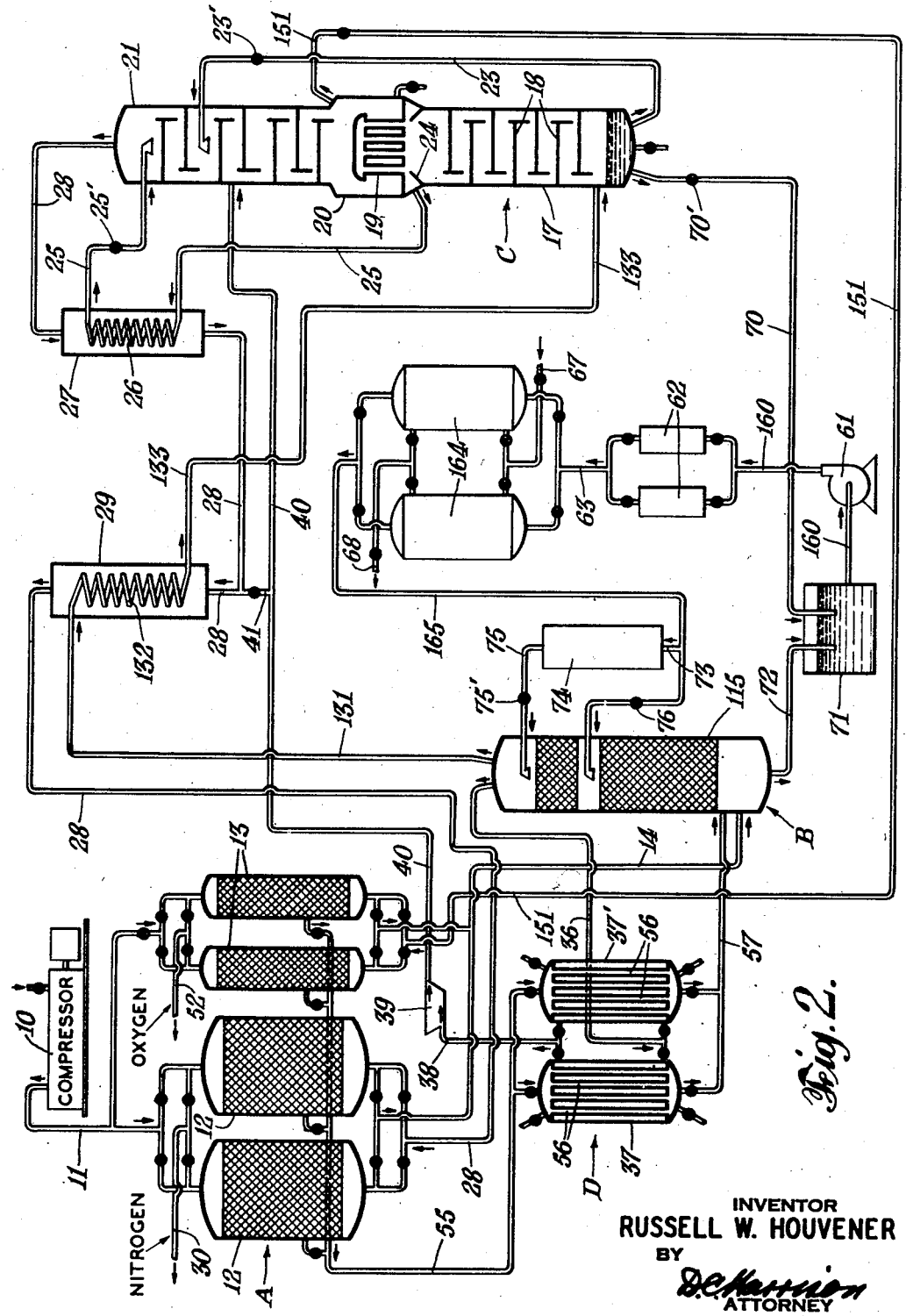

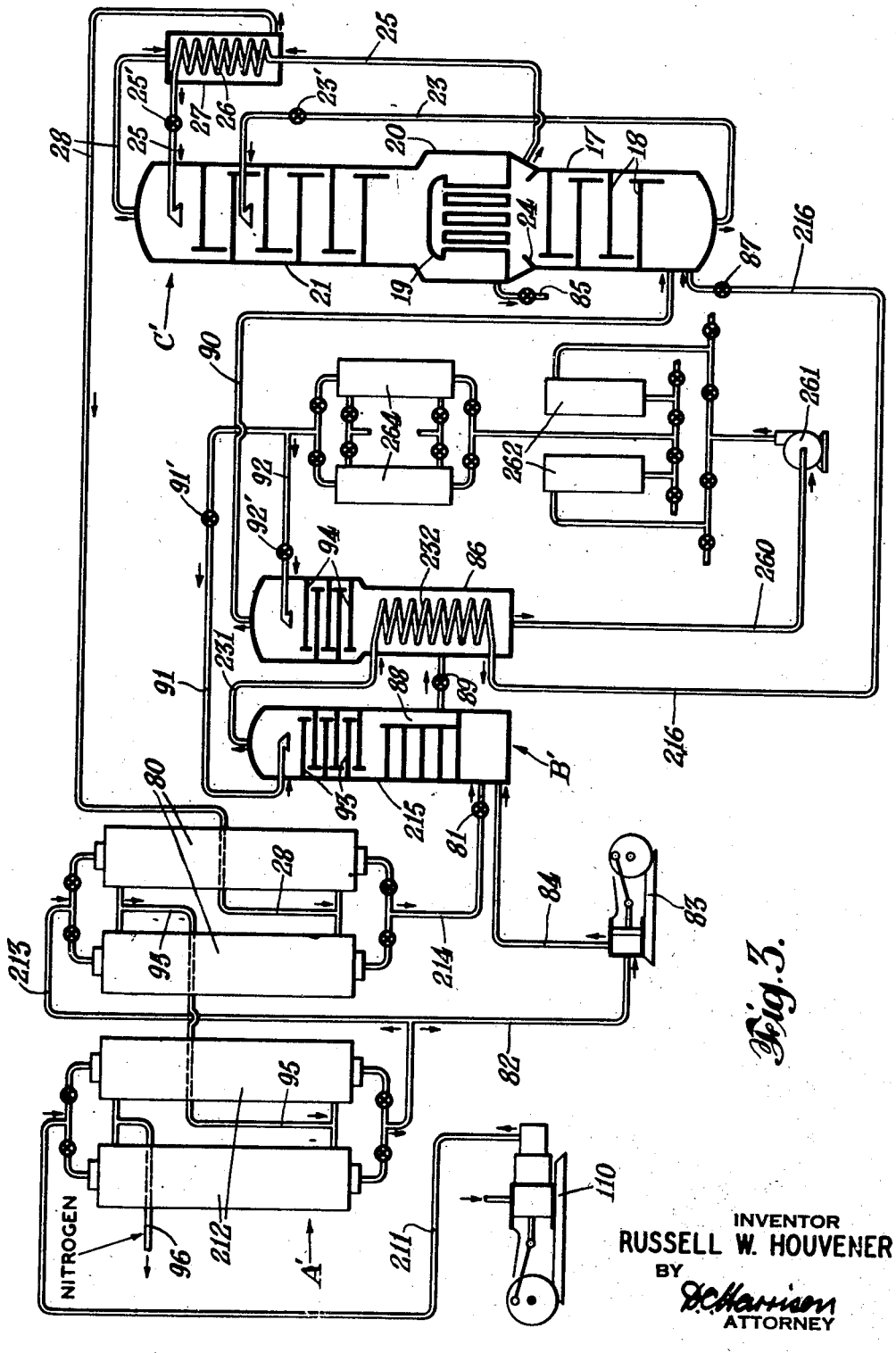

Patented Oct. 30, 1951

2,572,933

UNITED STATES PATENT OFFICE 2,572,933

PROCESS AND APPARATUS FOR ELIMINATING HIGHER-BOILING-POINT IMPURITIES PRIOR TO RECTIFICATION OF A GAS MIXTURE

Russell W. Houvener, Kenmore, N. Y., assignor, by mesne assignments, to Union Carbide and Carbon Corporation, a corporation of New York Application May 20, 1949, Serial No. 94,308

14 Claims. (Cl. 62—122)

This invention relates to a process of and apparatus for separating low-boiling point gas mixtures containing higher-boiling impurities, and more particularly to improved process and apparatus for eliminating higher-boiling point impurities prior to the rectification of a gas mixture such as air.

The invention will be described specifically as applied to the separation of air. Air contains, in addition to the low-boiling components, not only moisture and carbon dioxide, but small amounts of other higher-boiling point impurities that are normally gaseous, such as hydrocarbons. Moisture is eliminated usually by freezing it out during early stages of heat exchange, and in the case of regenerator heat exchange, a large part of the carbon dioxide may also be frozen out and removed by vaporization into outflowing products. Residual amounts of carbon dioxide and impurities in a finely divided frozen state which remain in air cooled to about liquefaction temperatures can be removed from the air by washing or scrubbing the air with liquid air and filtering the scrubber liquid. In practice it is found that small amounts of impurities nevertheless still reach the rectifying columns and are concentrated, particularly in the chamber where the oxygen product is boiled. In a gaseous oxygen producing plant especially, the chamber where the oxygen is evaporated collects residual impurities. One method of preventing excessive impurity accumulation is to periodically or continuously withdraw and discard some of the impurity-containing concentrate. Even with such withdrawal of oxygen product deposition of impurities on heat exchange surfaces is not prevented, and it is found that such deposition is very undesirable, especially in rectifying apparatus designed to operate at high efficiency.

It appears that certain small residues of carbon dioxide and hydrocarbon impurities remain in solution in liquid air and thus are not filterable. When dissolved impurities are concentrated at the low temperature of evaporating oxygen they are thrown out of solution. When scrubber liquid is filtered and passed to rectification columns the minute dissolved residues are washed down in the column eventually to the oxygen product which is partly evaporated in a chamber around the main condenser to provide vapors for rectification. In a gaseous oxygen producing plant, the liquid oxygen is completely evaporated to produce the product. Such concentration and evaporation causes deposition of solids to occur on heating surfaces, which not only is detrimental to efficiency but may also be hazardous.

Principal objects of the present invention are to provide a process and apparatus for eliminating impurities from a gas mixture such as air prior to its low-temperature separation, which avoids the above-mentioned difficulties; which provides for the practically complete removal of impurities from all of the gas mixture that is to be rectified; which not only substantially completely cleans a scrubber liquid of impurities but also avoids the passage of any scrubber liquid to the rectification; and which provides these advantages without any material additional operating cost or any effect on the efficiency of separation.

These and other objects and advantages of this invention will become apparent from the following description and the accompanying drawings, in which the figures are diagrammatic views showing exemplary embodiments of apparatus for carrying out the processes of the invention, particularly for the separation of air to produce a gaseous oxygen product, and wherein:

Fig. 2 is a similar view of a modification of the apparatus according to the invention; and Fig. 3 is a diagrammatic view illustrating the principles of the invention as applied in a plant employing air compressed to an initial pressure higher than the critical pressure of air and producing liquid oxygen.

Figure 1:
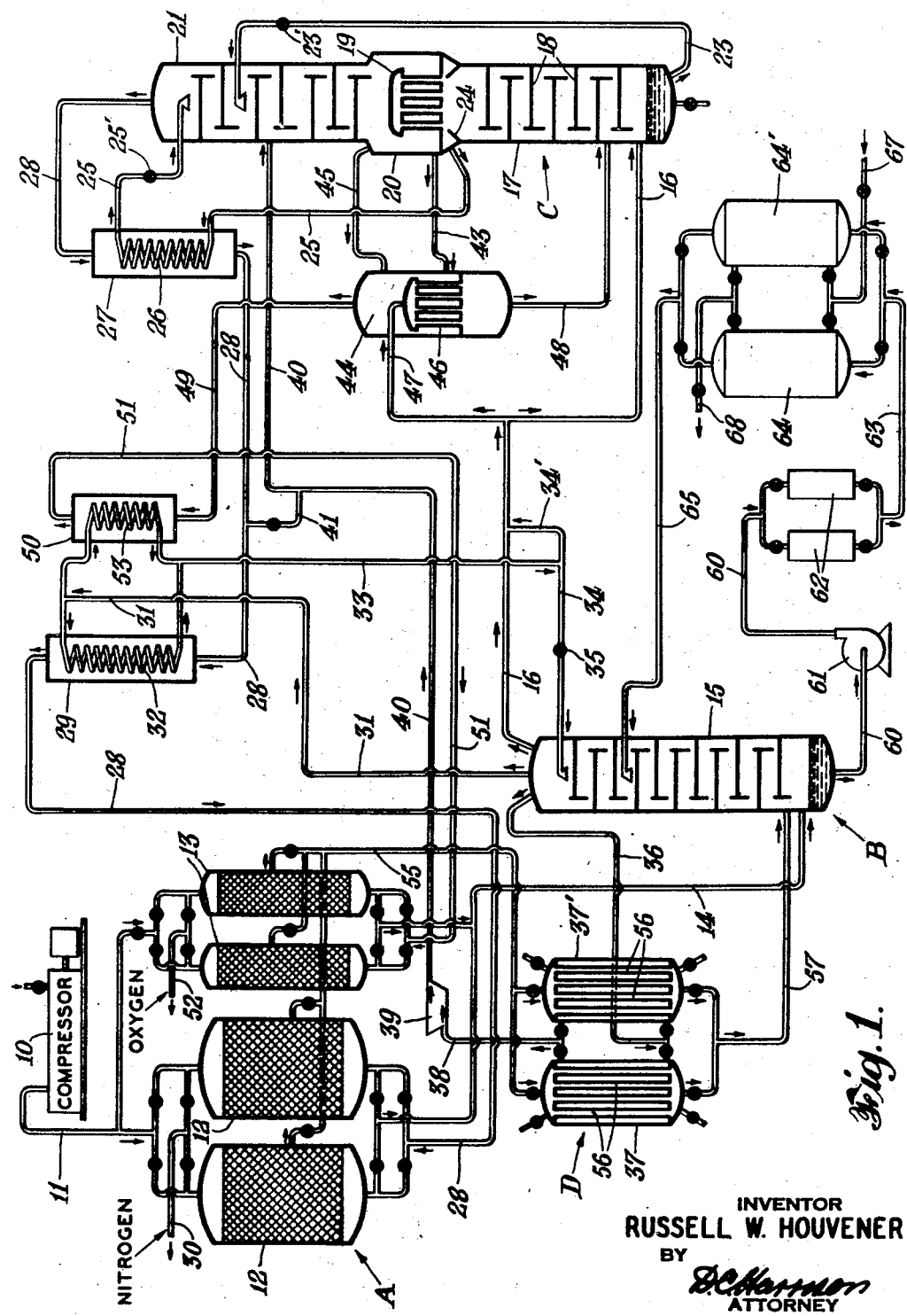
Fig. 1 is a diagrammatic view of an assemblage of apparatus in which the invention is applied in a plant for producing gaseous oxygen of commercial purity with lower power cost.

In the practice of the present invention, gas mixtures such as air containing impurities are compressed and cooled as usual through any suitable countercurrent heat exchangers or cold accumulators in such a manner that moisture and a large part of the carbon dioxide are removed. The cooled air is then scrubbed or washed with liquid air under a pressure below the critical pressure of air. Such scrubbing is preferably carried out countercurrently in a thorough manner, so that the air is washed last by the cleanest available scrubber liquid. The impurity-free air is then further treated to prepare for the rectification, for example, some of the cleaned air may be fed directly as gaseous feed to a higher-pressure chamber of the rectifying apparatus, and in cycles where it is necessary to provide extra refrigeration, some of the cleaned air may be expanded, after indirectly reheating it, by a turbine expander and then delivered to the lower pressure stage of rectification. Clean scrubber liquid if needed may be produced by liquefying some of the cleaned air. The impurities are eliminated and the concentration of them excessively in scrubber liquid is prevented by free circulation of the scrubber liquid from the scrubber through a filtering device or an adsorption medium, or preferably successively through a filter and an adsorber and then back to the scrubber.

If a filter alone is used, the dissolved impurities are recirculated with the liquid until the concentration becomes such that they are thrown out of solution and thereupon they are retained on the filter medium, which may be cleaned by providing duplicate filters so that one can be thawed and cleaned while the other is on-stream. It is found that certain impurities such as acetylene of limited solubility in liquid air may accumulate in the liquid to such a concentration before precipitating that their partial vapor pressure equals the partial pressure of such impurities in the air before it is scrubbed. In such case the impurity would pass through the scrubber and enter the rectifying column with the scrubbed air. By using an adsorption medium, preferably preceded by a filter, dissolved impurities can also be removed and the scrubber liquid returned to the scrubber will be very clean, so that the scrubbing can be more effective and the chance of carrying impurities out with the scrubbed air greatly reduced. The invention is useful in liquid oxygen producing plants and gaseous oxygen producing plants, but is especially useful in gaseous oxygen producing plants employing cycles providing low power costs.

Referring now to the drawings, and particularly to Fig. 1, the principles of the invention are applied to an assemblage of apparatus for a plant particularly suited to produce large quantities of commercial oxygen, the main components of apparatus being:

A. A main heat exchange system or regenerator set;
B. An impurity clean-up system;
C. A rectifying apparatus including higher and lower pressure stages; and
D. A refrigeration-producing means.

The air is compressed by suitable means such as a rotary compressor 10 to about a condensation pressure preferably between 95 p. s. i. and 35 p. s. i. and conducted by a conduit 11 to the warm ends of regenerator pairs 12 and 13. From the cold end of the regenerator pairs, the air is conducted by conduit 14 to the lower end of a wash tower or scrubber column 15. The regenerators may be similar to those disclosed in the United States patent of M. Frankl No. 1,970,299.

A large portion of the clean scrubbed air from the top of the scrubber column 15 is conducted by conduit 16 into the higher pressure chamber 17 of the two-stage rectifying apparatus C, which may be substantially of the customary type. The chamber 17 may have gas and liquid contact trays 18 therein and is closed at the top by a condenser 19 which condenses a portion of the lower-boiling nitrogen component by heat exchange with liquid oxygen product in a chamber 20 surrounding the condenser 19 and forming the lower end of the low-pressure rectifying column 21. Liquid rich in oxygen collecting at the base of the high-pressure chamber 17 is transferred to an intermediate point of the column 21 by a conduit 23 controlled by transfer valve 23'. Some of the liquid produced by the condenser 19 is collected in the shelf 24 and transferred by conduit 25 to the upper end of the column 21, the conduit 25 being controlled by a transfer valve 25'. Preferably there may be interposed in the conduit 25 a heat exchange passage or coil 26 in a heat exchanger 27 that is interposed in the effluent nitrogen conduit 28 from the top of the column 21. Also interposed in the effluent nitrogen conduit is a heat exchanger 29 employed for liquefying clean air, and after leaving the heat exchanger 29 the conduit 28 conducts the effluent nitrogen to the cold end of the regenerator pair 12 for passage therethrough and discharge at conduit 30.

For making liquid air, a portion of clean scrubbed air is conducted by a conduit 31 to a heat exchange coil 32 within the heat exchanger 29 and liquid air condensed in the coil 32 is conducted by a conduit 33 to a conduit 34 below conduit 16 and which has a branch 34' connecting with conduit 16 so that a large portion of the liquid air may flow to the conduit 16 and be carried with clean air to the high-pressure chamber 17. Another branch of the conduit 34 which is controlled by a valve 35 enters the top of the scrubber 15 so that the valve 35 may be opened whenever it is desired to add clean fresh scrubber liquid to the scrubber column 15. Valve 35 may be regulated to provide a continuous flow in amounts necessary to provide make-up for scrubber 15.

Any suitable means for producing the refrigeration required to operate the system may be employed. A convenient method comprises the work expansion of a portion of the clean scrubbed air. To this end conduit 36 draws clean scrubbed air from the upper end of the scrubber 15 to one end of a heat exchanger pair 37, 37' which heats the scrubbed air portion sufficiently so that refrigeration is produced with high efficiency and substantially no condensation of air. The warmed air is conducted by conduit 38 to an expansion turbine 39 coupled in a customary manner to means not shown for absorbing the power produced. The work-expanded air is conducted by a conduit 40, preferably to an intermediate portion of the column 21. A normally closed by-pass connection 41 between conduits 40 and 28 may be provided for use when initially cooling down the plant.

The oxygen product may be drawn as a gas from the chamber 20, but as shown in Fig. 1, it is preferably produced by conducting liquid oxygen from the chamber 20 through conduit 43 to an evaporator chamber 44 connected also by a pressure-equalizing connection 45 with the gas space of the chamber 20. The chamber 44 may be heated by suitable means, for example, by a condenser 46 therein which is supplied with clean scrubbed air through a branch conduit 47 of the conduit 16. Air condensed in the condenser 46 is drained by conduit 48 to the high-pressure chamber 17. The oxygen vapors from the evaporator 44 are conducted by a conduit 49 to a heat exchanger 50 and from the heat exchanger 50 through a conduit 51 to the cold end of the regenerator pair 13, from the warm end of which the oxygen product is withdrawn from a conduit 52. Disposed within the heat exchanger 50 is a heat exchange coil 53 connected to receive clean scrubbed air from the conduit 31 and to deliver liquid air to the conduit 33.

The heat exchangers 37 may be heated by a suitable warmer fluid stream, for example, a portion of air may be tapped off at an intermediate point of the regenerators and conducted by a conduit 55 to the warm end of a heat exchange passage 56 in the heat exchanger 37 and the cooled tapped-off portion of air is conducted by conduit 57 to the lower end of the scrubber 15.

None of the used scrubber liquid is passed to the rectification apparatus C, but the scrubber liquid is cleaned by withdrawing same from the bottom of the scrubber 15 through a conduit 60 which has interposed therein a rotary pump 61 designed for moving such cold liquids as liquid air. For example, the pump may be similar to that described in United States Patent No. 2,296,640. The liquid is preferably forced by the pump 61 through a filter 62 and then by a conduit 63 to one end of a chamber 64 filled with a suitable adsorbent substance, and from the other end of the chamber 64 the treated scrubber liquid is returned to the scrubber at a high point thereof by conduit 65. The filters and the adsorber chambers are preferably provided in duplicate in order that one of the respective pair may be taken out of service for cleaning while the other is in service. The adsorbent material in the chamber 64 is a material having the property of adsorbing dissolved impurities such as dissolved carbon dioxide and hydrocarbons from the liquid air passed therethrough. A suitable material, for example, is silica gel, and suitable means such as connections 67 and 68 to the chambers 64 may be provided for use in reactivating the silica gel of one of the chambers after a period of use. The silica gel may be retained between transverse screens in the chambers 64 and 64'.

The use of filters 62 is not essential, since the adsorbent material in the chamber 64 will retain the small particles of solid impurities as well as adsorb the dissolved impurities. However, the filters 62 generally are preferable to reduce the load on the adsorbent, since they will remove the bulk of the larger solidified particles of impurities. It will be seen that all the air which is to be rectified is thoroughly cleaned and is washed last by very clean scrubber liquid. Therefore the heat exchange surfaces, particularly those of the condensers 19 and 46, are protected against deposition of solid materials which would seriously reduce the efficiency of the apparatus and constitute a hazard. The impurities are efficiently and safely removed by concentrating them in a relatively small amount of scrubber liquid which is recirculated and from which the impurities are continuously removed so that the air may be washed by very clean scrubber liquid. Also, because only a relatively small amount of scrubber liquid need be recirculated, the filters and adsorbing device may be relatively small and efficient. The amount of power required for effecting the recirculation by pump 61 is so small as to be relatively immaterial. As is customary, all cold apparatus is thoroughly protected from atmospheric heat by efficient insulation.

In the figures, similar features are designated by similar reference characters. In the modification of Fig. 2, the main heat exchange system A, the rectifying column C, and the refrigeration-producing means D are the same as in Fig. 1. The scrubber column 115 is of the packed type, and all the clean scrubbed air employed as feed to the higher-pressure chamber 17 of the rectifying apparatus is conducted by conduit 131 to a heat exchange coil 132 in heat exchanger 29 and from the coil 132 through conduit 133 directly to the chamber 17, hence all of such portion of liquid condensed in the heat exchange coil 132 by heat exchange with effluent nitrogen is passed with the still vaporous portion of the air into the chamber 17. The make-up to supplement evaporation losses of scrubber liquid in the column 115 is provided by passing by gravity (or by pumping if desired) some of the liquid from the bottom of the chamber 17 through a conduit 70 controlled by a valve 70' into a sump chamber 71, the used scrubber liquid from the column 115 being also drained by a conduit 72 into the sump chamber 71. The suction of a liquid pump 61 is connected by conduit 160 to the sump chamber 71 and forces the liquid through the filters 62 and one or the other of a pair of adsorbers 164. From the opposite end of the adsorbers 164 the conduit 165 conducts the clean scrubber liquid to an intermediate point of the scrubber 115. For providing exceptionally pure scrubber liquid for the top of the scrubber 115 a branch 73 of conduit 165 conducts some of the initially cleaned scrubber liquid to one end of an adsorber chamber 74, from the other end of which a conduit 75 connects with the upper end of the chamber 115. The conduit 75 is controlled by a valve 75' and a control valve 76 is preferably provided in the conduit 165 on the downstream side of the branch 73.

The operation of the clean-up system of Fig. 2 is similar to that of Fig. 1, with the addition that the valves 75' and 76 may be regulated so that only a small portion of the recirculated scrubber liquid passes through the adsorber 74 and the main work of impurity removal occurs in the adsorber 164 or in both the filter 62 and adsorber 164. By providing very clean liquid at the top of the scrubber 115 the impurity vapor pressure at the upper end of scrubber 115 will be negligible so that practically no vapor phase impurities will leave with the scrubbed air; also there will be no likelihood of transfer of impurities through the cleaned air by entrainment of fine particles of scrubber liquid therein. Gaseous oxygen product is withdrawn from chamber 20 by conduit 151 to the oxygen regenerator pair 13.

The system of impurity removal according to the present invention is also adaptable to other types of air rectification apparatus, for example, one producing liquid oxygen, as described in connection with Fig. 3. In Fig. 3, the compressor 110 may be of the staged type providing compressed air at pressures above the critical pressure. Such compressed air may be cooled by a customary type heat exchange system A', for example, by conducting it through conduit 211 to heat exchange passages in heat exchangers 212 arranged particularly for removal of moisture by freezing. A portion of the intermediately cooled air is conducted by a conduit 213 to another heat exchange set 80 which cools it to a very low temperature, such that when expanded a substantial fraction becomes liquid. Such cold air, which is entirely gaseous and contains particles of frozen impurities, is passed by a conduit 214 into the lower part of a scrubber chamber 215. The conduit 214 has interposed therein an expansion valve 81 through which the air is throttle expanded immediately prior to passage into the scrubber 215 which collects the resulting liquid fraction.

Another portion of air for providing extra refrigeration is conducted by a branch conduit 82 to an expansion engine 83 and from thence into the scrubber 215 by conduit 84. Since it is necessary that a considerable portion of the air feed to the rectifying column C' be in the liquid state (corresponding to the product taken out in the liquid state), the scrubber system is arranged to operate at a higher pressure than the pressure of the first stage of rectification and a portion of scrubbed air is liquefied before it is fed to the column by heat exchange with scrubber liquid boiling at the pressure of the first stage of rectification. The rectifying column apparatus indicated generally at C' may be of the customary type for producing liquid oxygen and has a liquid oxygen withdrawal connection 85 from the lower part of the chamber 20. Clean scrubbed air from the top of the scrubber 215 may be conducted by a conduit 231 to a heat exchange coil 232 in a vaporizer chamber 86. Clean liquid air produced in the coil 232 is conducted with a remainder of vaporous air through conduit 216 into the first stage chamber 17 of the rectifying apparatus, there being an expansion valve 87 interposed in conduit 216. The scrubber liquid that overflows into a cup 88 passes through a valved connection 89 into the vaporizing chamber 86 wherein it is vaporized by liquefying a corresponding amount of the cleaned air passing through coil 232. The vapors which pass to the top of chamber 86 are conducted by conduit 90 to the first stage chamber 17.

A substantially constant quantity of residual scrubber liquid is recirculated in the system. This flows from chamber 86 through the conduit 260 to the suction of the pump 261 and from thence through the filters 262 and the adsorbers 264 and back to chamber 86. Preferably the purified scrubber liquid is divided and part is passed by conduit 91 to the upper end of scrubber chamber 215 and the other part is passed by conduit 92 to the upper end of vaporizer chamber 86, the conduits being controlled by valves 91' and 92' respectively. The upper portions of the chambers 215 and 86 are also preferably provided with gas washing trays 93 and 94 to insure that all the air passed to the rectifying column will have been washed last by liquid air containing the least impurities. In this system the pressure in chamber 215 would preferably be about 60 p. s. i. higher than the pressure in chamber 86 which is about that of the first stage of rectification. Hence there is a pressure reduction of that amount at valves 87 and 89 and also at valve 92'. The pump 261 provides the necessary boost in pressure and the valve 91' may be operated substantially open while the valve 92' is adjusted to regulate the amount of liquid by-passed to chamber 86. If desired the conduit 90 may connect to an intermediate part of the upper column 21 instead of to lower column 17 so that the pressure in chamber 86 need be only that of the upper column and the scrubber 215 may then operate under a pressure only slightly above that of the lower column 17. The effluent nitrogen, as is customary, is passed to the cold end of main heat exchanger 80 by the conduit 28 and from the warm end thereof through a conduit 95 to the cold end of heat exchanger 212 and to the atmosphere from the warm end thereof through conduit 96.

It will be seen that the invention provides for the practically complete removal of the minute amounts of impurities in air, particularly the most undesirable impurities including acetylene, before the air enters the rectifying apparatus so that no accumulation of impurities will occur in liquid oxygen or on the oxygen vaporizing surfaces. This is accomplished in part by not admitting any scrubber liquid to the rectifying column and especially by scrubbing the air that is fed to the column with a scrubber liquid that is substantially free of dissolved impurities. The invention is especially useful for gaseous oxygen producing plants but may be used in liquid oxygen producing plants without seriously increasing the operating cost.

While several embodiments of exemplary apparatus have been described in order to disclose the principles of the present invention, it is contemplated that modifications may be made in the process and apparatus without departing from the spirit and scope of the invention.

What is claimed is:

1. A process for eliminating higher-boiling impurities from a gas mixture such as air before it is subjected to low-temperature rectification, which process comprises providing a stream of the mixture under pressure, freed of moisture, and cooled to a low temperature; washing such stream at a condensation pressure below 150 p. s. i. with a scrubber liquid to remove the impurities from said gas stream and retain them in the scrubber liquid; forming the scrubber liquid by liquefaction of part of the scrubbed gas mixture; and eliminating impurities from said scrubber liquid by passing used scrubber liquid from the washing in intimate contact with an adsorbent material which selectively retains the impurities.

2. A process for eliminating higher-boiling impurities from a gas mixture such as air before it is subjected to low-temperature rectification, which process comprises providing a stream of the mixture under pressure, freed of moisture, and cooled to a low temperature; washing such stream at a condensation pressure with a scrubber liquid comprising a liquid fraction of the gas mixture to remove the impurities from said gas stream and retain them in the scrubber liquid; continuously eliminating impurities from said scrubber liquid by recirculating used scrubber liquid from the washing in intimate contact with an adsorbent material which selectively retains the impurities; and returning the cleaned scrubber liquid to said washing operation.

3. A process for separating a gas mixture according to claim 2 in which said washing is carried out in successive stages, said cleaned scrubber liquid being returned to the initial stage of washing, and in which fresh scrubber liquid is supplied to a later stage of the washing.

4. A process for separating a gas mixture according to claim 2, in which said washing is carried out in successive stages, and said contact of scrubber liquid with adsorbent is effected in successive stages, a large portion of the liquid passing an earlier stage of contact being returned to an earlier stage of the washing and the liquid passing the later stage of contact being returned to a later stage of the washing.

5. A process for eliminating higher-boiling impurities from a gas mixture such as air before it is subjected to low-temperature rectification, which process comprises providing a stream of the mixture under pressure, freed of moisture, and cooled to a low temperature; washing such stream at a condensation pressure below 150 p. s. i. with a liquefied fraction of said gas mixture to remove the impurities from said gas stream and retain them in the scrubber liquid; continuously removing the impurities from said scrubber liquid in successive stages, the solidified impurities being substantially removed by filtration in a first stage and the remaining impurities being removed in a subsequent stage by adsorption in an adsorbing medium, the used liquid being recirculated through said stages and returned to the washing.

6. A process for separating a gas mixture according to claim 5, in which said liquid fraction is produced substantially by fractional liquefaction of gas mixture after it has been washed and in which such liquid fraction is added to a later zone of the washing.

7. A process for separating a gas mixture containing higher-boiling impurities which comprises providing a stream of the mixture at a condensation pressure, freed of moisture, and cooled to a low temperature; countercurrently washing such stream with a liquefied fraction of said gas mixture to remove the impurities from said gas stream and retain them in the scrubber liquid; continuously eliminating impurities from said scrubber liquid by recirculating used scrubber liquid from the washing in intimate contact with an adsorbent material which selectively retains the impurities; returning the cleaned scrubber liquid to said washing operation; liquefying a portion of the clean washed gas mixture, using a portion of the liquefied mixture to replenish scrubber liquid evaporated during the washing; rectifying the balance of the washed gas mixture with the remainder of the liquefied portion thereof to separate lower and higher-boiling products, and using some of the refrigeration of at least the lower-boiling separation product to effect said partial liquefaction of the washed gas mixture.

8. A process for eliminating higher-boiling impurities from a gas mixture such as air before it is subjected to low-temperature rectification, which process comprises providing a stream of the mixture under pressure, freed of moisture, and cooled to a low temperature; washing such stream at a condensation pressure below 150 p. s. i. with a liquefied fraction of said gas mixture to remove the impurities from said gas stream and retain them in the scrubber liquid; continuously eliminating impurities from said scrubber liquid by recirculating used scrubber liquid from the washing in intimate contact with an adsorbent material which selectively retains the impurities; effecting liquefaction of a substantial portion of the clean washed gas mixture; and rectifying the balance of the washed gas mixture with such liquefied portion thereof to separate lower and higher boiling products.

9. A process for separating a gas mixture according to claim 8 in which said liquefaction of washed mixture is effected by heat exchange with scrubber liquid to vaporize an equivalent amount of the scrubber liquid and in which the vapor of the scrubber liquid is added to the rectifying operation.

10. Apparatus for eliminating higher-boiling impurities from a gas mixture such as air after it is cooled to a low temperature in heat exchange devices and before it is delivered to a rectifying column, which apparatus comprises means disposed between the heat exchange device and the rectifying column for washing a stream of the cooled and substantially moisture-free gas mixture at a condensation pressure with scrubber liquid comprising a liquid fraction of the gas mixture to remove the impurities from the gas mixture and retain them in the scrubber liquid; a chamber containing an adsorbent material adapted to remove the impurities from the scrubber liquid; and means for recirculating scrubber liquid from a lower part of the washing means, through said adsorbent chamber and back to the washing means.

11. Apparatus for eliminating higher-boiling impurities from a gas mixture such as air after it is cooled to a low temperature in heat exchange devices and before it is delivered to a rectifying column, which apparatus comprises means disposed between the heat exchange device and the rectifying column for countercurrently washing a stream of the cooled and substantially moisture-free gas mixture at a pressure below 150 p. s. i. with scrubber liquid comprising a liquid fraction of the gas mixture to remove the impurities from the gas mixture and retain them in the scrubber liquid; a filter device adapted to retain solid particles of impurities; a chamber containing an adsorbent material adapted to remove the impurities from the scrubber liquid; and means for recirculating scrubber liquid from a lower part of the washing means, through said filter device and then through said adsorbent chamber and back to the washing means.

12. Apparatus for eliminating higher-boiling impurities from a gas mixture such as air after it is cooled to a low temperature in heat exchange devices and before it is delivered to a rectifying column, which apparatus comprises means disposed between the heat exchange device and the rectifying column for countercurrently washing a stream of the cooled and substantially moisture-free gas mixture at a pressure below 125 p. s. i. with scrubber liquid comprising a liquid fraction of the gas mixture to remove the impurities from the gas mixture and retain them in the scrubber liquid; a chamber containing an adsorbent material adapted to remove the impurities from the scrubber liquid; a second chamber containing adsorbent material; and means including conduit connections for recirculating used scrubber liquid from a lower part of said washing means through said first adsorbent chamber, then delivering a part of the scrubber liquid to an intermediate part of said washing means, and for passing the balance of the scrubber liquid through the second adsorbent chamber and then to the upper portion of said washing means.

13. Apparatus for eliminating higher-boiling impurities from a gas mixture such as air after it is cooled to a low temperature in heat exchange devices and before it is delivered to a rectifying column, which apparatus comprises means disposed between the heat exchange device and the rectifying column for washing a stream of the cooled and substantially moisture-free gas mixture at a condensation pressure with scrubber liquid comprising a liquid fraction of the gas mixture to remove the impurities from the gas mixture and retain them in the scrubber liquid; a chamber containing an adsorbent material adapted to remove the impurities from the scrubber liquid; means for recirculating scrubber liquid from a lower part of the washing means, through said adsorbent chamber and back to the washing means; and means for passing to the rectifying column only clean washed gas mixture and liquefied washed gas mixture.

14. Apparatus for eliminating higher-boiling impurities from a gas mixture such as air after it is cooled to a low temperature in heat exchange devices and before it is delivered to a rectifying column, which apparatus comprises means disposed between the heat exchange device and the rectifying column for washing a stream of the cooled and substantially moisture-free gas mixture at a condensation pressure with scrubber liquid comprising a liquid fraction of the gas mixture to remove the impurities from the gas mixture and retain them in the scrubber liquid; a chamber containing an adsorbent material adapted to remove the impurities from the scrubber liquid; means for recirculating scrubber liquid from a lower part of the washing means, through said adsorbent chamber and back to the washing means; means for liquefying a portion of the clean washed gas mixture by heat exchange with recirculating scrubber liquid; and means for passing to the rectifying column the remaining washed gas mixture, the liquefied portion of washed gas mixture and vapors produced by said heat exchange.

RUSSELL W. HOUVENER.

REFERENCES CITED

The following references are of record in the file of this patent:

UNITED STATES PATENTS

| Number | Name | Date |
| --- | --- | --- |
| 1,724,513 | Pollitzer | Aug. 13, 1929 |
| 1,864,585 | De Baufre | June 28, 1932 |
| 1,891,125 | Gessel | Dec. 13, 1932 |
| 2,128,692 | De Baufre | Aug. 30, 1938 |